United States Patent
Yamamoto et al.

[11] Patent Number: 5,899,758
[45] Date of Patent: May 4, 1999

[54] FLEXIBLE PRINTED CIRCUIT HARNESS

[75] Inventors: Yoshihisa Yamamoto, Kanagawa; Hiroshi Kojima, Tokyo, both of Japan

[73] Assignee: The Whitaker Corporation, Wilmington, Del.

[21] Appl. No.: 08/935,945

[22] Filed: Sep. 23, 1997

Related U.S. Application Data

[62] Division of application No. 08/790,208, Feb. 5, 1997, Pat. No. 5,707,245, which is a continuation of application No. 08/434,258, May 5, 1995, abandoned.

[30] Foreign Application Priority Data

| Jun. 7, 1994 | [JP] | Japan | 6-148504 |
| Jun. 13, 1994 | [JP] | Japan | 6-154246 |

[51] Int. Cl.⁶ .................................................. H01R 9/09
[52] U.S. Cl. .......................................................... 439/77
[58] Field of Search .............................. 439/77, 67, 498, 439/541.5

[56] References Cited

U.S. PATENT DOCUMENTS

| 2,634,310 | 4/1953 | Eisler | 439/77 |
| 2,961,629 | 11/1960 | Kamm | 439/67 |
| 3,152,288 | 10/1964 | Mittler | 439/77 |
| 3,727,168 | 4/1973 | Henschen et al. | 439/498 |
| 3,766,439 | 10/1973 | Isaacson | 439/77 |
| 4,143,932 | 3/1979 | Boutros | 439/77 |
| 4,815,990 | 3/1989 | Ristedt et al. | 439/496 |
| 4,902,236 | 2/1990 | Hasircoglu | 439/77 |
| 4,997,377 | 3/1991 | Goto et al. | 439/68 |
| 5,065,280 | 11/1991 | Karnezos et al. | 361/386 |
| 5,265,322 | 11/1993 | Fisher et al. | 29/848 |
| 5,348,482 | 9/1994 | Rudy, Jr. et al. | 439/61 |
| 5,348,488 | 9/1994 | Green et al. | 439/140 |
| 5,383,787 | 1/1995 | Switky et al. | 439/67 |
| 5,573,409 | 11/1996 | Shirley et al. | 439/67 |
| 5,591,047 | 1/1997 | Yamada et al. | 439/541.5 |

FOREIGN PATENT DOCUMENTS

| 1-175183 | 7/1989 | Japan . |
| 1-132074 | 9/1989 | Japan . |
| 2-41378 | 3/1990 | Japan . |
| 6-48045 | 6/1994 | Japan . |
| 6-56992 | 6/1994 | Japan . |
| 6-36079 | 2/1995 | Japan . |

OTHER PUBLICATIONS

Flex Circuits, Minco Products Inc., Date Apr. 1991; 8 pages.

*Primary Examiner*—Paula Bradley
*Assistant Examiner*—Tho D. Ta
*Attorney, Agent, or Firm*—Katherine A. Nelson; Anton P. Ness

[57] ABSTRACT

A memory card connector with an ejection mechanism 10 comprises an operating rod 15 sliding lengthwise along a side surface of a frame 11 and a cam bar 16 linked to the operating rod 15 intended for the ejection of the card. A spring 17 is attached to an overhang at an inner end of the operating rod 15 and to a mounting member 19 on the frame 11. Because of such an arrangement, the operating rod 15 is forced forward; and at the same time, due to the fact that the mounting member 19 is closer to the center of the connector than an overhang 34 of the operating rod 15, the operating rod is forced to the side surface of the frame 11.

5 Claims, 8 Drawing Sheets

FLEXIBLE PRINTED CIRCUIT HARNESS

This application is a Divisional of application Ser. No. 08/790,208 filed Feb. 5, 1997, now U.S. Pat. No. 5,707,245, which in turn is a Continuation of application Ser. No. 08/434,258, filed May 5, 1995 now abandoned.

FIELD OF THE INVENTION

This invention relates to card connectors, especially to connectors for memory cards having mechanisms for the ejection of cards inserted in such connectors and a flexible printed circuit harness therefor.

BACKGROUND OF THE INVENTION

In recent years, the necessity of interfaces used for the connection of high-performance computers to external devices has greatly increased. Memory cards are an example of such devices. Memory cards contain external memory and the data to be processed by the computer, and during their use, they are connected to the inside circuitry by means of electrical connectors.

An example of a conventional card connector is depicted in Japanese Utility Model Publication No. 92-8241. This card connector comprises a frame retaining the card and a connector section which is electrically connected to the card retained in the frame. The connector section connects the card with the circuits on the circuit board, with the frame being fixed to the circuit board and at the same time implementing a connection to ground. If necessary, this card connector can be equipped with an ejection mechanism. The ejection mechanism has an operating rod sliding in the direction opposite to that of the card insertion and a cam bar operationally joined to the operating rod. Pressure applied to the operating rod is transmitted to the cam bar which moves, this providing pressure to the card and ejecting it.

However, the ejection mechanism of the card connector described above has a disadvantage to the effect that when no card is inserted in the connector, the operating rod, especially in the units not attached to circuit boards, can freely move within its moving range. This results in a rattling sound in personal computers of the notebook type when they are carried around. In addition, when the button of the operating rod is made flat with the surface of the computer case, it is necessary to provide a depression for the operation of the button when the card is ejected. However, such a depression is not desirable, because foreign objects may get in it.

In order to solve these problems, ejection mechanisms described in Japanese UM Publication No. 89-132074 and Japanese UM Publication No. 90-41278 were proposed in which a spring was provided to force the operating rod forward and its button to the surface of the case. However, it was necessary to provide in such ejection mechanisms guiding grooves for the operating rod which resulted in an increased width of the mechanisms which was not desirable from the standpoint of compactness.

Therefore, the purpose of this invention is to offer a card connector equipped with a small-sized ejection mechanism having a spring-loaded operating rod.

In many cases, electronic and electric devices have to be electrically connected to devices mounted on printed circuit boards through circuits formed thereon, as well as to devices mounted on other circuit boards, and the circuit boards have to be electrically connected to each other.

For example, a circuit board with circuits formed on both sides is inserted in a connector of an assembly of circuit board connectors, and connector contacts are to be connected to the conductive pads formed on the circuit board by soldering. In addition, connectors have to be mounted on both sides of the circuit board and connected to the external circuits in order to make it possible to make connections with circuit boards or other devices.

However, the soldering of contacts of such a connector assembly to both sides of a circuit board is a difficult process.

In addition, since the above-mentioned connectors are secured to both sides of the circuit board, there is no flexibility in the positioning of the devices or circuit boards to be connected by means of these connectors, thus making it impossible to compensate for minor shifts in their position or to change their position.

The wiring to a number of external devices or circuit boards from the above-mentioned assembly of the circuit board connectors is relatively simple, but the process of assembly of many connectors involving a number of complicated and cost-intensive operations needs simplification.

SUMMARY OF THE INVENTION

This invention is directed to a card connector equipped with an ejection mechanism. The ejection mechanism comprises a spring which forces a card contained in a frame forwardly, an operating rod which can slide lengthwise along a side surface of the frame and a cam bar which is mounted on the frame and can swivel by the action of the operating rod thus ejecting the card. The operating rod has an overhang spaced from the side surface of the frame. One end of the spring is attached to the overhang and the other end of the spring is attached to the frame at a location close to the first end and slightly forward.

A memory card connector comprises a frame in which a memory card is to be received and an ejection mechanism mounted on the frame for ejecting the memory card therefrom. The ejection mechanism includes an operating rod movably mounted on the frame and operatively connected to a cam bar pivotally mounted on the frame for engagement with the memory card thereby ejecting the memory card from the frame upon linear movement of the operating rod, and a spring connected between the operating rod and the frame for maintaining the operating rod in a non-ejecting position and against the frame.

The card connector with an ejection mechanism according to this invention has an ejection mechanism including a sliding operating rod attached to a frame and a cam bar mounted on the frame and operatively connected to the operating rod which ejects the card when the operating rod is pushed. The operating rod has a middle section which extends along a side surface of the frame and an overhang at the back which extends outside the frame when the operating rod is attached to the frame.

A spring is provided to force the operating rod forwardly. One end of the spring is attached to an overhang of the operating rod, and the other end is secured to a mounting member on the frame. Since the overhang is offset from the frame to the outside more than the mounting member, the spring action forces the operating rod also towards the side surface of the frame.

This invention is also directed to a connector assembly containing contacts arranged in two rows having soldering contact sections oriented in mutually opposed directions and of a flexible printed circuit (FPC) having soldering pads on one surface. The assembly is characterized by the fact that the flexible printed circuit is folded, thereby forming a two-layer structure with the soldering pads being soldered to the contact sections of the connector.

This invention provides for an FPC harness intended for the mutual connection of various devices and circuit boards by means of an FPC. On one side of the FPC, pads are located for the attachment of connectors by soldering. When the connectors are mounted on the FPC, the contacts are soldered to the pads.

In this invention, the FPC is bent to form a wiring structure having at least two layers. Each of the two-layers are independently flexible. The contacts of at least one pair of the connectors mounted on the FPC are soldered so that the connectors are located back-to-back.

BRIEF DESCRIPTION OF THE DRAWINGS

Embodiments of the invention will now be described by way of example with reference to the accompanying drawings in which.

DETAILED DESCRIPTION OF THE INVENTION

Figure 1:
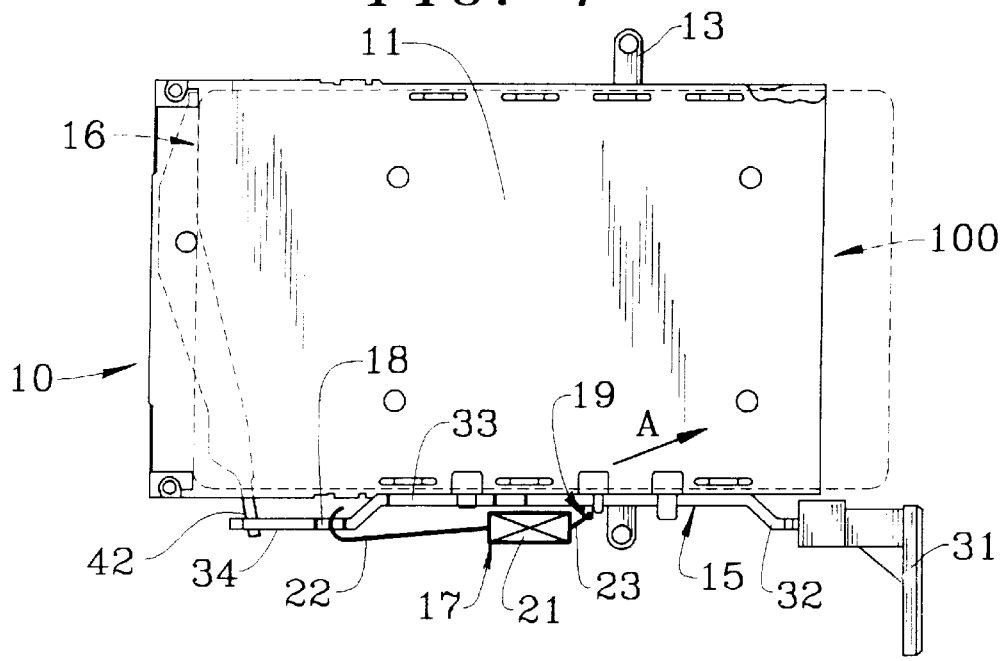
FIG. 1 is a plan view and FIG. 2 is a side view of the preferred embodiment of a card connector with ejection mechanism according to this invention.

Below, a detailed explanation concerning preferred embodiments of this invention with reference to the drawings is given. FIG. 1 represents the first embodiment of a card connector 10 with an ejection mechanism. The card connector 10 has a frame 11 holding a memory card 100 and a connector 12. The connector 12 is located at the back of the frame 11. The frame 11 is formed from a sheet metal material, and it has, at its side surfaces, mounting lugs 13 for the mounting of the frame to a circuit board and a grounding contact 14 used for the grounding of the memory card. In addition, at the side surface of the frame 11, an operating rod 15 is provided for the ejection of the card which can slide along the side surface. The inner end of the operating rod 15 is attached to a cam bar 16. A similar structure is disclosed in Japanese UM Publication No. 92-82141.

Figure 2:
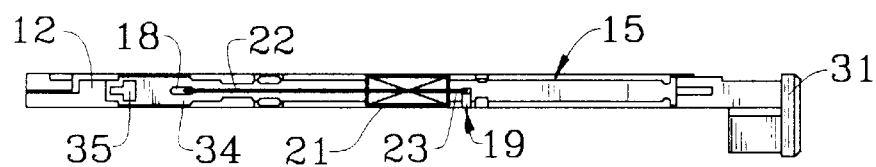
Figure 3:
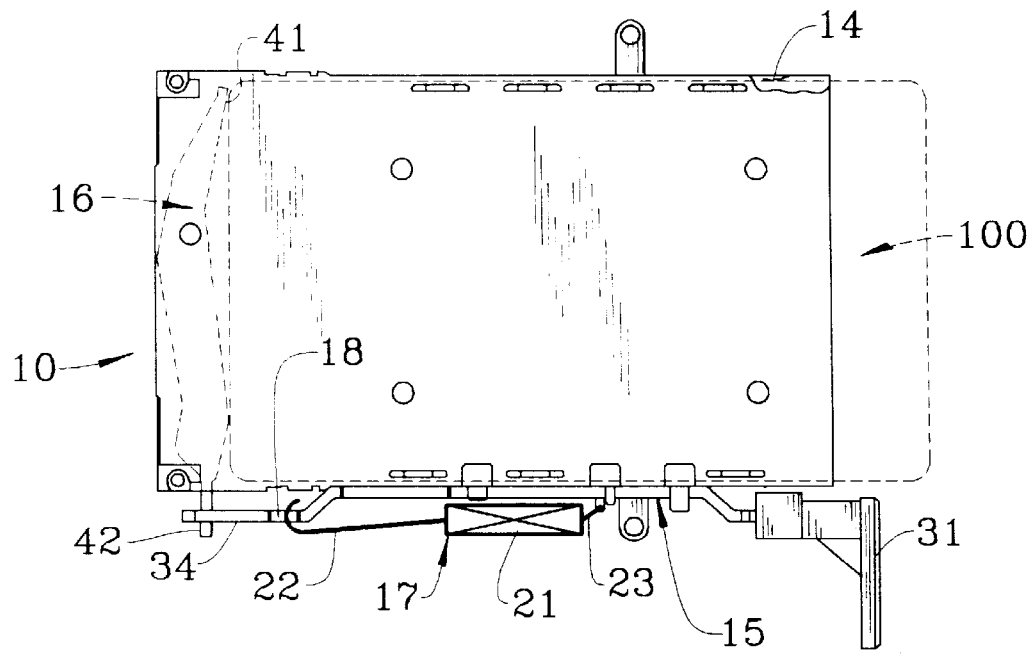
FIG. 3 is a plan view of the card connector shown in FIG. 1 when the card is ejected.
Figure 4:
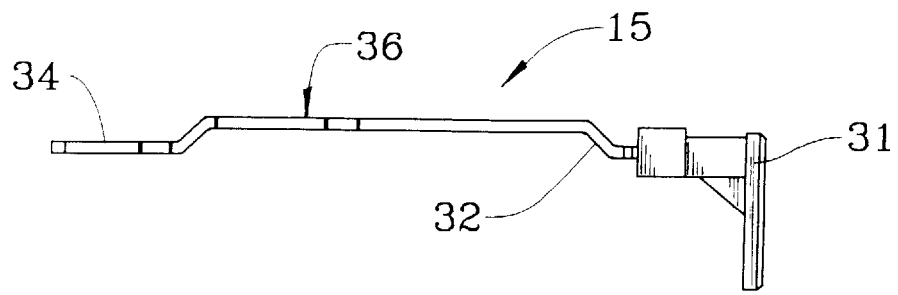
FIG. 4 is a plan view.

As can be seen from FIG. 1, a spring 17 is attached to the operating rod 15 used for the ejection. The spring 17 has a spiral section 21 and straight sections 22 and 23 at both ends of the spiral section 21. The straight sections 22 and 23 extend lengthwise from diametrically opposed locations of the spiral section 21. As can be seen in FIGS. 1–3, in the operating rod 15, a mounting groove 18 is located for the attachment of one end of the straight section 22 of spring 17. The operating rod 15, as shown in FIG. 4, has a front end 32 to which a button 31 is fixed, a central section 33 which is pressed against and can slide along a side surface of the frame 11, and an inner end 34 having an opening 35 for the connection to a cam 16.

The other end of the spring 17 is attached to the frame 11. As can be seen from FIGS. 8 and 9. The mounting member 19 extends outside and up like a crank. In the vicinity of the front end of the mounting member 19, a hook 51 is provided for the attachment of one end of the straight section 23 of the spring 17. As shown in FIG. 1, this end of the spring 17 is located closer to the frame 11 compared to the end attached to operating rod 15.

Figure 7:
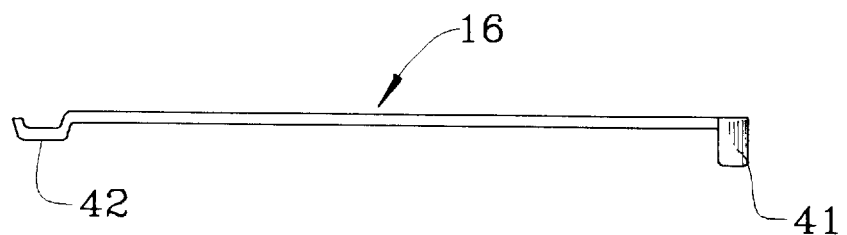
FIG. 7 is a front view of a cam bar used in the card connector shown in FIG. 1.

Next, the operation of the card ejection process of the card connector 10 will be explained. In FIG. 1, the memory card 100 is shown by the broken line. When the memory card 100 is inserted, the operating rod 15 and the cam bar 16 are in the position shown in FIG. 1. The ejection of the memory card 100 is carried out by pressing the button 31. At that time, the operating rod 15 is moved back and the cam bar 16 turns. With this, an ejecting surface 41 shown in FIG. 7 of the cam bar 16 exerts pressure on the edge of the memory card 100 and ejects it.

When the memory card 100 is ejected, the operating rod 15 and the cam bar 16 assume the positions shown in FIG. 3. As can be seen from the drawing, the spring 17 is stretched lengthwise. Therefore, the button 31 slides forward when the pressure is not applied to it any more. After the memory card 100 is ejected, the operating rod 15 and the cam bar 16 assumes the position shown in FIG. 1.

As it was explained above, one end of the spring 17 is attached to the inner end 34 of the overhang of the operating rod 15 and the other end is attached to the mounting member 19 of the frame which is located closer to frame 11 relative to the inner end 34. Therefore, the operating rod 15 is forced in the direction indicated the FIG. 1 by the slanted arrow A. Due to this arrangement, the central position 33 of the operating rod 15 is pressed against the side surface of the frame 11 with an adequate force. Therefore, the operating rod is at all times pressed against the side surface of the frame, thus eliminating a rattling sound.

Figure 5:
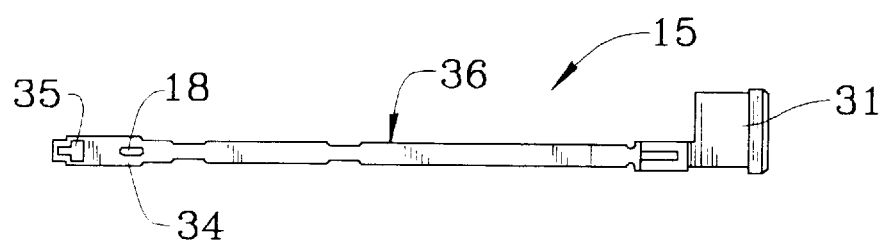
FIG. 5 is a side view and FIG. 6 is an enlarged view of an operating rod used in the card connector shown in FIG. 1.
Figure 6:
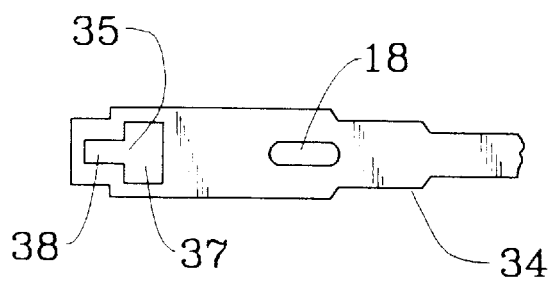

As shown in FIGS. 5 and 6, the inner end of the operating rod 15 has a T-shaped opening 35. In the status shown in FIG. 1, the engagement end 42 of the cam bar 16 is passed through the opening 35. The operating rod 15 is a metal member 36 and the button 31 is fixed to the metal member 36. If the operating rod 15 is attached to the opposite side of the card connector 10, the same metal member 36 can be used because the opening 35 has a wider portion 37. In such a case, the end 42 can be also inserted in the opening 35. The opening 35 has also a narrower portion 38 extending backward from the wider portion 37. The purpose of this narrower portion 38 is that the operating rod can be moved to the vertical position, thus making it possible to operationally connect the cam bar 16 and the operating rod 15.

As was mentioned above, the engagement of the operating rod 15 and the cam bar 16 is accomplished by inserting the engagement end 42 into the wider portion 37 of the opening 35. Therefore, mechanical stress in the engagement end 42 during movement of the operating rod 15 is relatively small. This makes it possible to achieve a smooth ejection without an excessive stress in the cam bar 16, thus avoiding excessive wear thereof.

Figure 10:
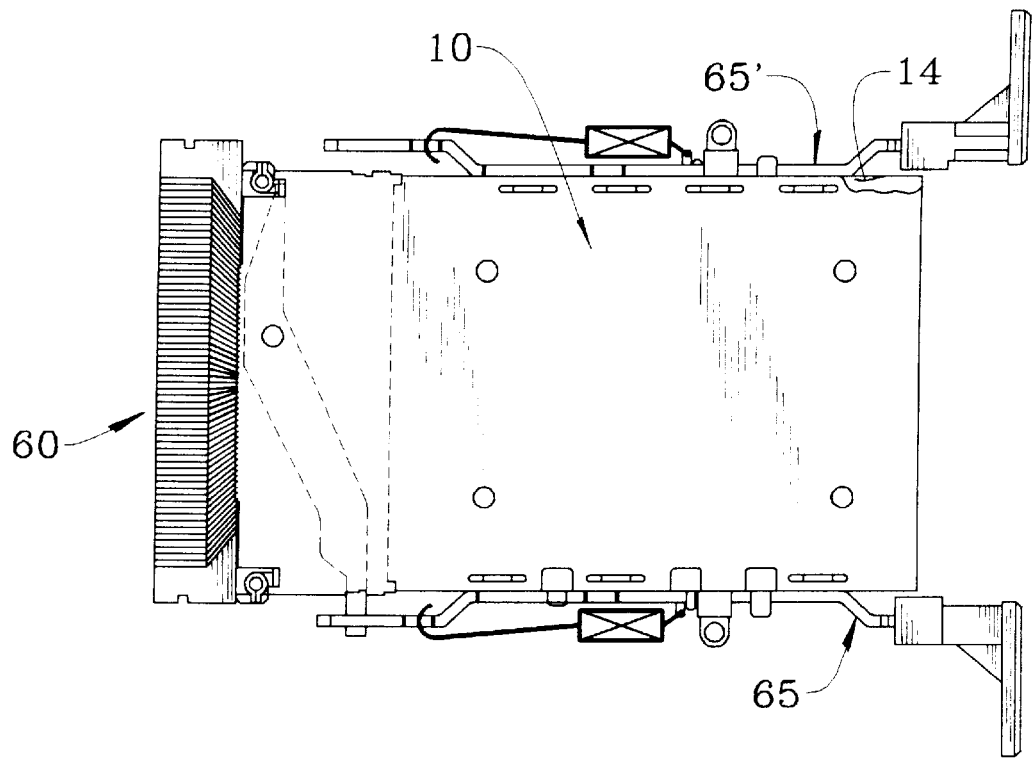
FIGS. 10, 11 and 12 are respective plan, side and front views of an assembly of connectors shown in FIG. 1.
Figure 11:
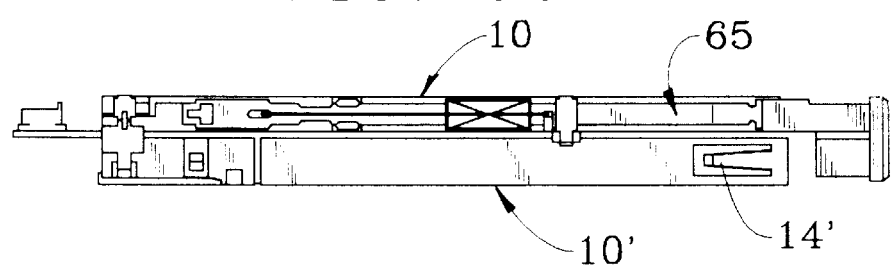
Figure 12:
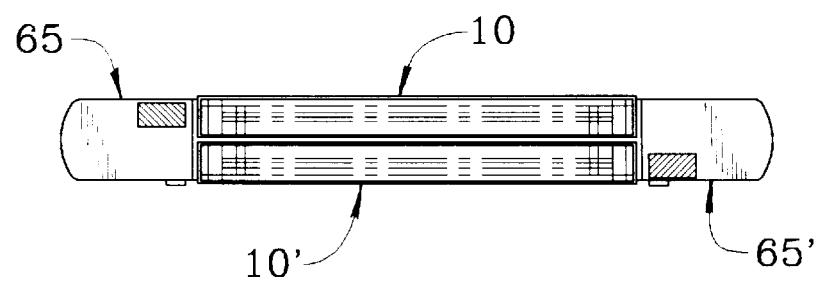

FIG. 10 represents an assembly 60 or two card connectors 10 and 10' shown in FIG. 1. In the connector assembly 60, the card assemblies 10 10' are placed back-to-back. The method (or similar methods) of connection of the card connectors 10 and 10', as well as their mounting on the printed circuit boards (not shown in the drawing) are described in Japanese UM Publication No. 92-92948.

The assembly of the connectors similar to the assembly 60 shown in FIG. 10 corresponds to three types (Types I, II, and III) defined in the Standards set by PCMCIA (Personal Computer Memory Card International Association). Memory cards of Type I or Type II are inserted individually in separate card connectors 10, 10', and can be individually ejected by their respective ejection mechanisms 65, 65'. If such an assembly is used for Type III cards, one of the ejection mechanisms 65, 65' (see FIG. 10) is removed and can be replaced with a different device, for example, by a device preventing wrong side insertion of a card placed near the grounding contacts 14, 14'.

Figure 8:
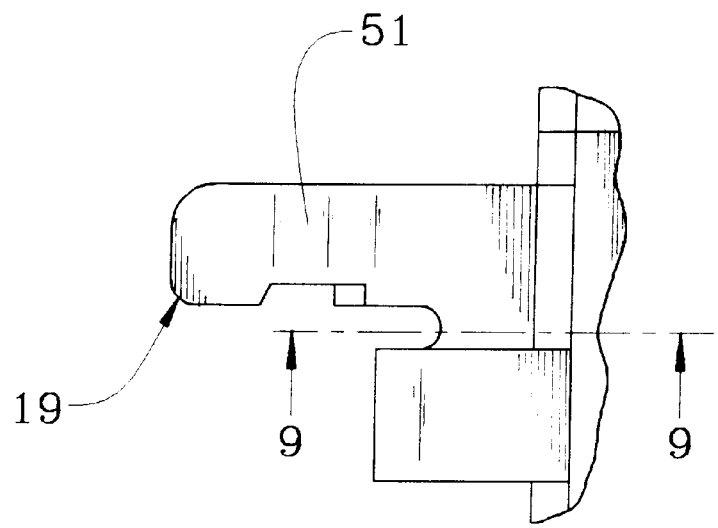
FIG. 8 is a part plan view of a mounting member located on a side surface of a frame.
Figure 9:
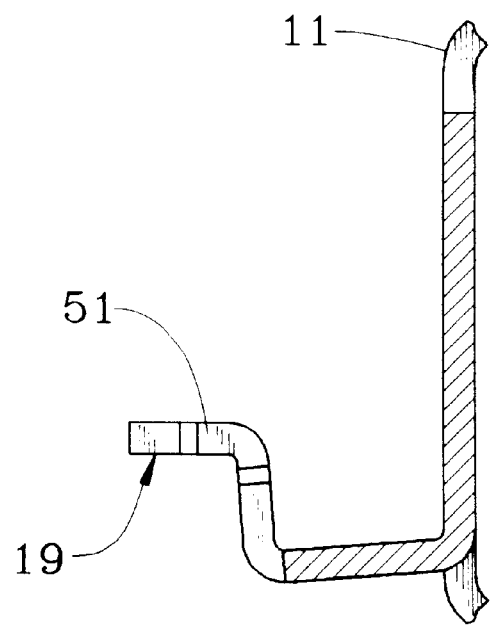
FIG. 9 is a part cross-sectional view taken along the line 9—9 in FIG. 8.
Figure 13:
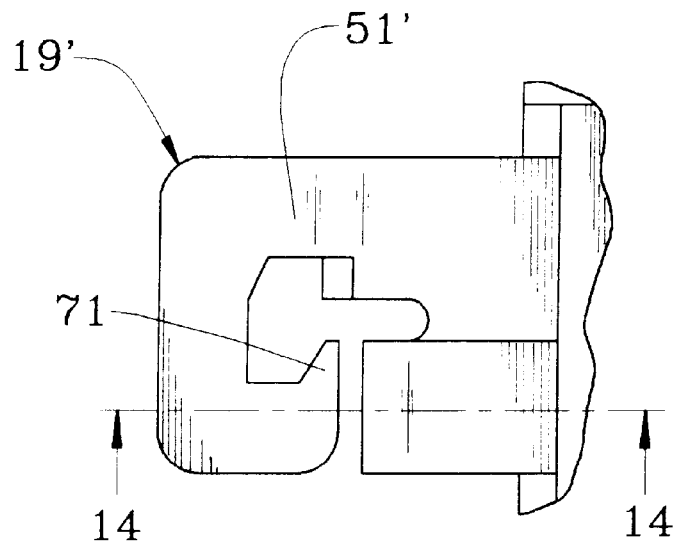
FIG. 13 is a part plan view of another example of the mounting member shown in FIG. 8.
Figure 14:
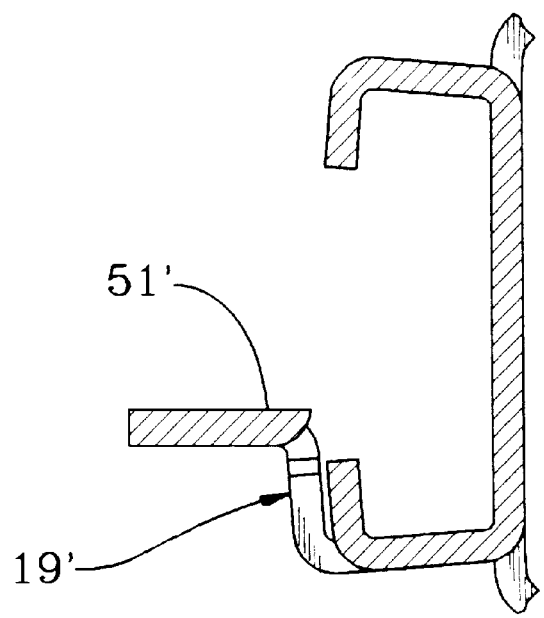
FIG. 14 is a cross-sectional view taken along line 14—14 of FIG. 13.

FIGS. 13 and 14 depict a mounting member 19' having a hook 51' which is a modified version of the mounting member 19 shown in FIGS. 8 and 9. The hook 51' is roughly of a C-shaped configuration and has protrusion 71 extending inside. Its purpose is to prevent the spring 17 from slipping off.

Above, explanations concerning preferred embodiments of the memory card connector according to this invention have been given. However, this invention, by no means, is limited to these examples only. For instance, they can be used not only for memory cards but also for various IC cards. In addition, experts in the art can make various modifications and changes in the connector, such as, for example, one end of the spring may be attached to the cam bar 16 rather than to the operating rod 15.

The memory card connector with ejection mechanism according to this invention has an ejection mechanism including a sliding operating rod mounted on a frame, a cam bar used for the ejection of the card pivotally mounted on the frame which is connected to the operating rod and a spring connected between the frame and the operating rod which forces the operating rod forward and to a side surface of the frame. Due to the fact that the operating rod is guided by the side surface of the frame, the ejection of the card implemented by pushing the operating rod is carried out in a smooth manner. Since the operating rod is guided solely by the side surface of the frame there is no need for any other guiding devices. As a result, the connector can be made as a compact small-dimension unit.

In addition, the fact the operating rod is at all times pressed against the side surface of the frame makes it possible to eliminate a rattling sound and to prevent foreign objects, which can impair the operation of the connector, from getting between the frame and the operating rod.

Figure 15:
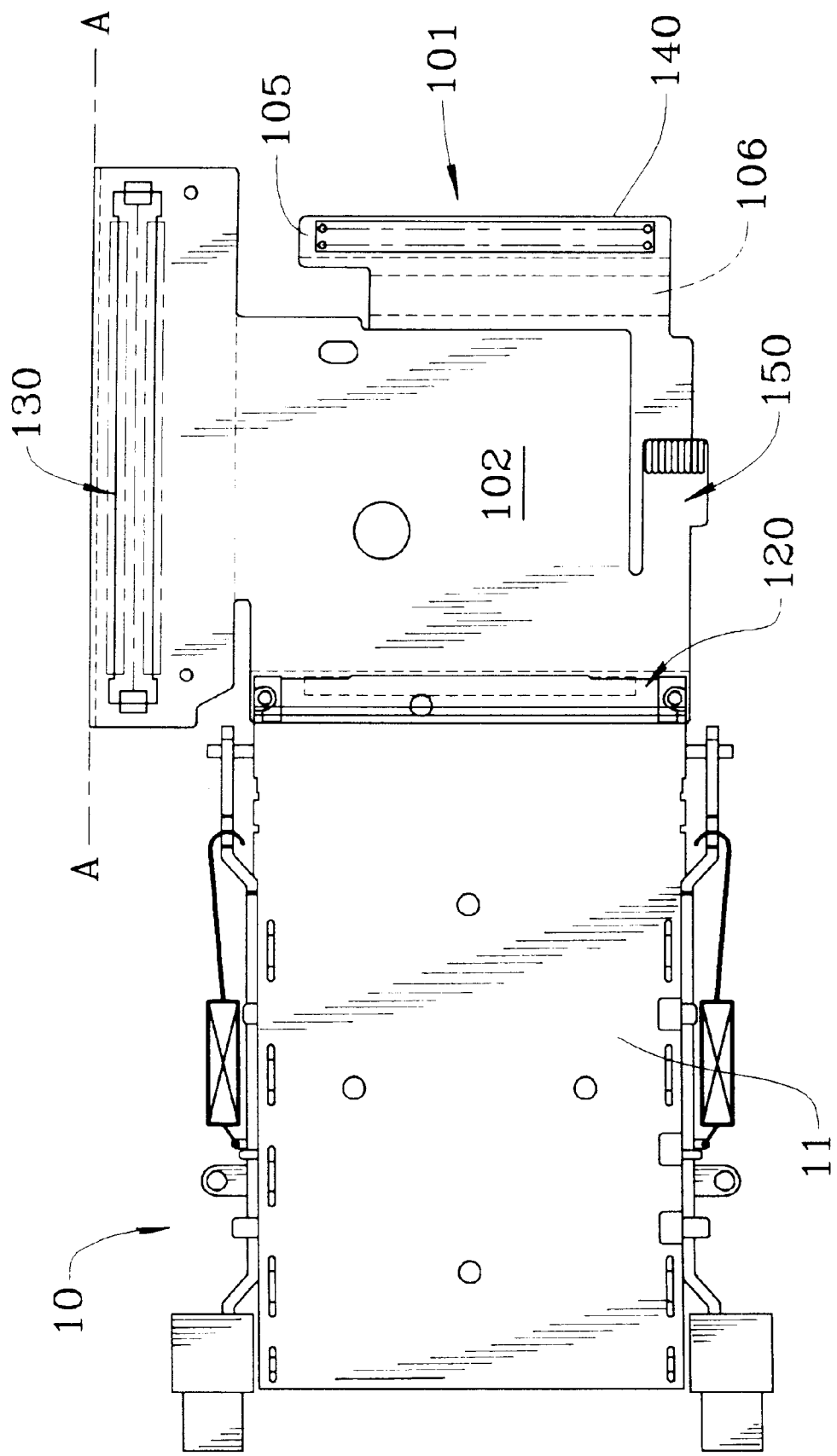
FIG. 15 is a plan view of the preferred embodiment of a circuit connector assembly according to this invention. Wiring in the form of conductive paths on the FPC is omitted.

FIG. 15 represents a plan view of an FPC harness according to this invention. As shown, the FPC harness 101 has an assembly of memory card connectors 120, a first connector 130, a second connector 140, a port connection device 150 and a flexible printed circuit (FPC) 102 with the conductive paths thereon connecting all the components.

Figure 17:
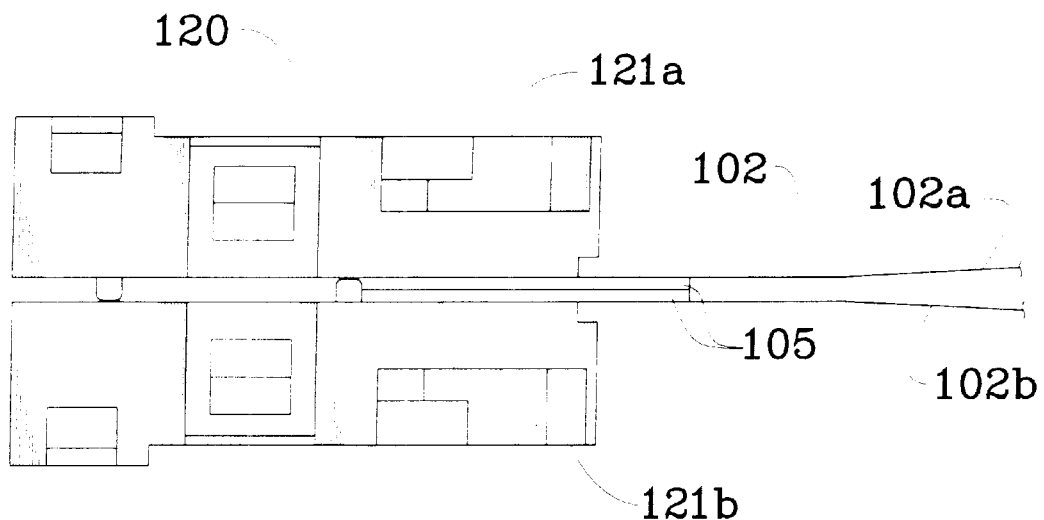
FIGS. 17 and 18 are respective side and cross sectional views showing mutual positions of card connectors and the FPC.
Figure 18:
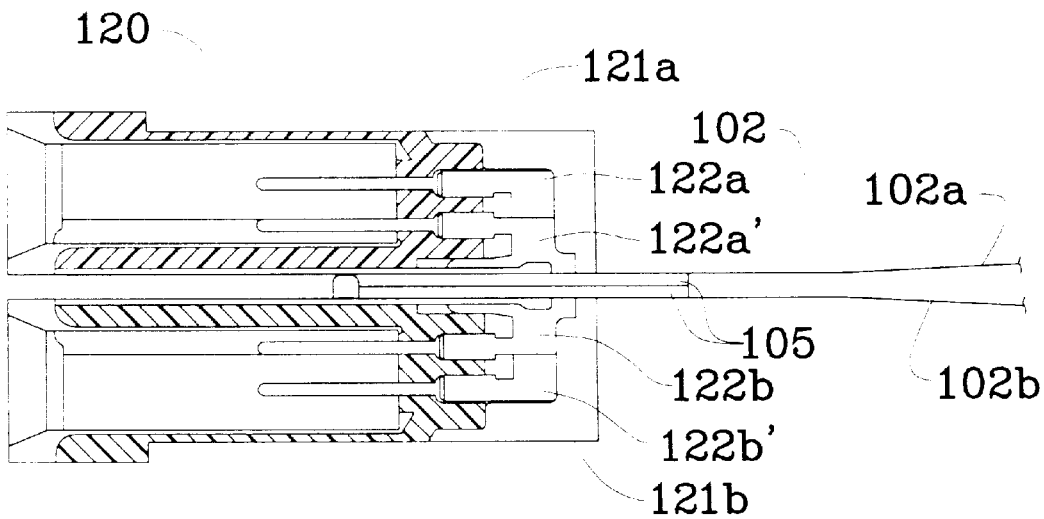

FIGS. 17 and 18 represent a side view and a cross section of the assembly of the memory card connectors. As can be seen from FIGS. 17 and 18, the assembly of connectors 120 includes connectors 121a and 121b placed on top of each other. This stacked arrangement is described in Japanese UM Publication No. 92-92948, This two-tier structure is suitable for memory cards of Types I, II and III according to the classification set forth in the Standards set by PCMCIA.

Figure 16:
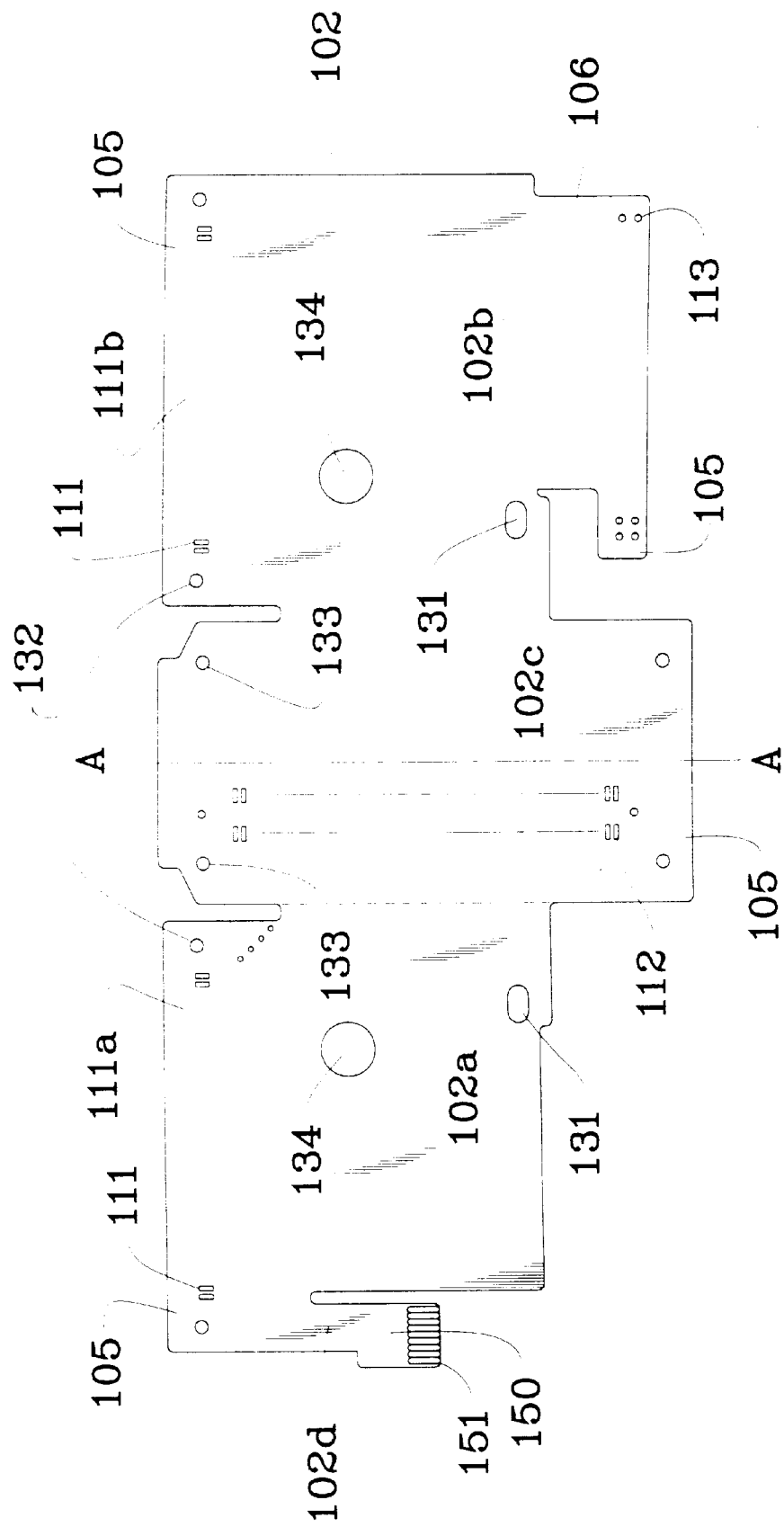
FIG. 16 is a plan view of the flexible printed circuit (FPC) used in the circuit connector assembly shown in FIG. 15.

FIG. 16 represents a plan view of the FPC 102 used in the assembly of the connectors 120, 130 and 140. The FPC 102 has conductive pads 111 and 112 intended for soldering of the connectors 121a and 121b of the assembly of connectors 120 and connector 130 thereto, and conductive pads 113 having openings for the mounting of the connector 140 thereto. The conductive pads 111 intended for the contacts of upper and lower connectors 121a and 121b of the assembly of connectors 120 are divided in two groups 111a and 111b located on two different sections 102a and 102b of the FPC 102 as illustrated in FIG. 16 conductive pads 112 are located on section 102c of FPC 102. The port connection device 150 is provided for the connection to a matching connector (not shown in the drawing) and it has conductive strips 151 arrayed at a certain pitch on section 102d of FPC 102. For reinforcement of the portion of the FPC corresponding to the connector and for the filling of the empty space purposes, plastic boards 105 are attached to the FPC 102 at the appropriate locations. In order to assure a smooth bending of the FPC 102, a tape 106 is placed on the FPC 102. Locations of the plastic boards 105 and the tape 106 in FIGS. 15 and 16 are shown with broken lines. In the appropriate locations, of the FPC 102, mounting holes 131, 132, 133 and 134 are provided for the attachment to the main board.

Below, the process of the assembly of the connector assembly will be explained. The first stage of the process comprises the soldering of the connectors 121a and 121b to the FPC, and of the first connector 130 and the second connector 140. The most difficult task is to insert the multiple contact pins (not shown in the drawing) of the second connector 140 through openings in the pads 113. The contact pins are inserted from the backside of the FPC and soldered on the front side. The connectors 121a and 121b, the first and the second connectors are soldered on the front side.

The second stage comprises bending the FPC. In FIGS. 15 and 16, the position of the bend is marked by the line A—A. After the bending operation, the mounting holes 134, 121, and 133 are aligned. The mounting holes 132 shown in FIG. 16 are used for the assembly of the connectors and for the attachment of the FPC.

The third stage comprises the assembly of the connector unit 120. Connectors 121a and 121b are assembled during the second stage. As shown in FIGS. 17 and 18, during the second stage the connectors 121a and 121b are placed so that the FPC 102 is sandwiched between them. In such a position, the connectors and the FPC are secured by means of screws and fasteners to the frame 11 of a memory card connector 10. The FPC 102 is retained between the connectors 121a and 121btogether with the plastic boards 105, and the contacts 122a, 122a' 122b and 122b' are soldered to the pads 111. As can be seem from FIG. 15, upon completion of the assembly, the connector device 150 makes it possible to implement an electrical connection to external equipment. As can be seen from and FIGS. 15, 17 and 18, sections 102a and 102b of FPC 102 which are located close to each other retain their individual flexibility. For example, the joining direction of a connector matching with the second connector may vary within certain limits.

Above, explanations concerning a preferred embodiment of the FPC harness according to this invention has been given. However, this invention, is not limited to these examples only but includes also various changes and modifications which can be made by experts in the art.

The FPC harness according to this invention eliminates the necessity of soldering operations on both sides of circuit boards when they are equipped for connection to external equipment. The soldering operations are performed on one side of the FPC only, thus making the manufacturing process much easier. In addition, due to the fact that the soldering operations accomplish the connection of the input/output devices for the electrical and external devices by means of the wiring contained on the FPC, the time required for the assembly can be greatly reduced.

Since all necessary wiring from the connector unit to the connectors for external equipment is provided on a multi-layered individually flexible FPC of the FPC harness according to this invention, a more efficient use of space is possible, due to the fact that flexibility of individual sections of the FPC makes it possible to change, within certain limits, the position of the connection with a connector or the direction of the connection.

We claim:

1. A flexible printed circuit harness for electrical connection to electrical connectors, comprising a flexible printed circuit including a central section and first and second sections extending outwardly therefrom;

conductive pads extending along the first and second sections adjacent first edges thereof and along the central section adjacent a center line thereof;

the central section being bent along the center line so that the first and second sections overlap one another with the conductive pads thereon being located on outer surfaces of the first and second sections and an outer surface of the central section, thereby enabling the conductive pads on the first and second sections to be electrically connected respectively to first and second electrical connectors and the conductive pads on the central section to be electrically connected to a third electrical connector.

2. A flexible printed circuit harness as claimed in claim 1, wherein one of the first and second sections includes conductive pads located along a second edge thereof for electrical connection to a fourth electrical connector.

3. A flexible printed circuit harness as claimed in claim 2, wherein the second edge extends normal to the first edge.

4. A flexible printed circuit harness as claimed in claim 1, wherein one of the first and second sections has a separate section extending along a third edge thereof and on which conductive pads are located for electrical connection to a fifth electrical connector.

5. A flexible printed circuit harness as claimed in claim 4, wherein the third edge extends parallel to the first edge.

* * * * *